(12) United States Patent
Nishida et al.

(10) Patent No.: US 11,124,249 B2
(45) Date of Patent: Sep. 21, 2021

(54) DEFLECTOR STRUCTURE OF AUTOMOTIVE VEHICLE

(71) Applicant: MAZDA MOTOR CORPORATION, Hiroshima (JP)

(72) Inventors: Shuhei Nishida, Hiroshima (JP); Yoshiatsu Kuga, Hiroshima (JP); Akihiro Nakata, Higashi Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 78 days.

(21) Appl. No.: 16/659,403

(22) Filed: Oct. 21, 2019

(65) Prior Publication Data

US 2020/0130755 A1 Apr. 30, 2020

(30) Foreign Application Priority Data

Oct. 31, 2018 (JP) .............................. JP2018-205088

(51) Int. Cl.
*B62D 35/00* (2006.01)
*B62D 35/02* (2006.01)
*B62D 21/15* (2006.01)

(52) U.S. Cl.
CPC ........... *B62D 35/02* (2013.01); *B62D 21/152* (2013.01); *B62D 35/005* (2013.01)

(58) Field of Classification Search
CPC .............................. B62D 35/005; B62D 35/02
USPC ........................................... 296/180.1, 180.2
See application file for complete search history.

(56) References Cited

U.S. PATENT DOCUMENTS

| | | | | |
|---|---|---|---|---|
| 6,033,010 A | * | 3/2000 | Preiss | B62D 35/005 296/180.1 |
| 8,517,451 B2 | * | 8/2013 | Kakiuchi | B62D 35/02 296/180.1 |
| 9,937,966 B1 | * | 4/2018 | Yoon | B62D 37/02 |
| 10,086,885 B2 | * | 10/2018 | Zuhlsdorf | B62D 35/02 |
| 2015/0225026 A1 | * | 8/2015 | Ohira | B62D 25/08 296/180.1 |
| 2015/0274224 A1 | * | 10/2015 | Ito | B62D 35/02 296/180.1 |
| 2016/0339970 A1 | * | 11/2016 | Shibutake | B62D 25/2036 |

FOREIGN PATENT DOCUMENTS

EP 1674381 A1 * 6/2006 ............. B62D 35/02
JP 2017-077846 A 4/2017

* cited by examiner

*Primary Examiner* — Jason S Daniels
(74) *Attorney, Agent, or Firm* — Studebaker & Brackett PC

(57) ABSTRACT

A deflector structure of an automotive vehicle comprises a deflector. The deflector comprises a traveling-wind control part to control a flow of a traveling wind generated in forward traveling of an automotive vehicle. The traveling-wind control part comprises an outside control section and an inside control section. The outside control section and the inside control section are shaped such that an atmospheric pressure of an outside space portion which is positioned just in front of an outside part, in the vehicle width direction, of a front wheel is lower than that of a central space portion which is positioned just in front of a central part, in the vehicle width direction, of the front wheel at a level position from a lower end of the deflator to a vicinity below the lower end of the deflector.

6 Claims, 6 Drawing Sheets

DEFLECTOR STRUCTURE OF AUTOMOTIVE VEHICLE

BACKGROUND OF THE INVENTION

The present invention relates to a deflector structure of an automotive vehicle.

Conventionally, it has been developed to suppress turbulence of an airflow caused by a front wheel in order to improve the fuel economy (consumption) of an automotive vehicle. This airflow turbulence is caused when a traveling wind flowing down below a floor of a vehicle front portion and reaching the front wheel is disturbed by a rotation of the front wheel in forward traveling of the automotive vehicle.

In Japanese Patent Laid-Open Publication No. 2017-77846, for example, a deflector is provided at a lower face of the automotive vehicle which is positioned in front of a front wheelhouse so that the traveling wind generated in the forward traveling of the automotive vehicle can be prevented from hitting the front wheel as much as possible. This deflector comprises a vertically-extending wall part which protrudes downwardly from the above-described lower face of the automotive vehicle positioned in front of the front wheelhouse, wherein the traveling wind hits this wall part.

The inventors of the present invention have diligently performed analysis for further improvement of an aerodynamic characteristic. As a result, the followings have been found. That is, even if the deflector of the above-described patent document is provided in front of the front wheel, an outside end face, in a vehicle width direction, of the front wheel is generally positioned on an outside, in the vehicle width direction, of an outside end, in the vehicle width direction, of the above-described wall part of the deflector. Accordingly, the traveling wind passing through on the outside, in the vehicle width direction, of the vertically-extending wall part of the deflector hits the outside part, in the vehicle width direction, of the front wheel. Therefore, an atmospheric pressure of an outside space portion which is positioned just in front of this outside part of the front wheel becomes higher than that of a central space portion which is positioned just in front of a central part, in the vehicle width direction, of the front wheel at a level position from a lower end of the wall part of the deflector to a vicinity below the lower end of the deflector.

In a case where a distribution of the above-described atmospheric pressure is formed, the traveling wind flows down obliquely rearwardly-and-outwardly so as to turn away from and avoid the outside space portion. Thus, this traveling wind flows down away from the outside end face of the front wheel, without flowing down along this outside end face. Accordingly, the conventional deflector makes a situation where it is likely that a separated airflow (vortex) is improperly generated around the outside end face of the front wheel. Thus, there is room for improvement in reducing the air resistance.

SUMMARY OF THE INVENTION

The present invention has been devised in view of the above-described matter, and an object of the present invention is to provide a deflector structure of an automotive vehicle which can properly reduce the air resistance by making the traveling wind flow down along the outside end face, in the vehicle width direction, of the front wheel in the forward traveling of the automotive vehicle.

The present invention is a deflector structure of an automotive vehicle, comprising a deflector provided at a lower face of the automotive vehicle which is positioned in front of a front wheelhouse so as to be forwardly spaced apart from a front wheel, wherein the deflector comprises a traveling-wind control part to control a flow of a traveling wind generated in forward traveling of the automotive vehicle, the traveling-wind control part comprises an outside control section provided at an outside end portion, in a vehicle width direction, of the deflector and an inside control section positioned on an inside, in the vehicle width direction, of the outside control section, and the outside control section and the inside control section are shaped such that an atmospheric pressure of an outside space portion which is positioned just in front of an outside part, in the vehicle width direction, of the front wheel is lower than that of a central space portion which is positioned just in front of a central part, in the vehicle width direction, of the front wheel at a level position from a lower end of the deflator to a vicinity below the lower end of the deflector.

According to the present invention, the atmospheric pressure of the outside space portion is lower than that of the central space portion at the level position from the lower end of the deflector to the vicinity below the lower end of the deflector by shapes of the outside control section and the inside control section. The above-described distribution of the atmospheric pressure causes the traveling wind to flow obliquely rearwardly-and-outwardly from the central space portion toward the outside space portion at the space portion positioned in front of the front wheel because the traveling wind tends to flow down to the outside space portion having the lower atmospheric pressure, avoiding the central space portion having the higher atmospheric pressure. Then, the traveling wind flowing toward the outside space portion from the central space portion comes to flow along the end face of the outside end face of the front wheel. Accordingly, it is unlikely that the separated airflow (vortex) is generated around the outside end face of the front wheel, so that the air resistance of the automotive vehicle can be properly reduced.

In an embodiment of the present invention, the inside control section is formed by a lower face of the deflector such that the traveling wind flows down toward the front wheel along the inside control section, and the outside control section is formed by a fin portion which protrudes to an outside in the vehicle width direction at an end portion of the deflector which is positioned at the outside in the vehicle width direction and a rear side in a vehicle longitudinal direction, the fin portion being configured to have a front-side end face which extends obliquely such that an outside part, in the vehicle width direction, of the front-side end face is positioned at the rear side in the vehicle longitudinal direction and an extension line of the front-side end face does not intersect the front wheel in a bottom view of the vehicle.

According to this embodiment, the traveling wind flowing along the inside control section hits the central part, in the vehicle width direction, of the front wheel, so that the atmospheric pressure of the central space portion becomes higher. Meanwhile, the traveling wind flowing on the outside, in the vehicle width direction, of the above-described traveling wind flowing along the inside control section is bent to the outside in the vehicle width direction by the front-side end face of the fin portion, so that this traveling wind does not hit the front wheel. Accordingly, the atmospheric pressure of the outside space portion becomes lower than that of the central space portion.

In another embodiment of the present invention, the inside control section is a slant face which is configured such that a rear side, in the vehicle longitudinal direction, of the slant face is positioned at a lower level and an extension line of the slant face intersects the front wheel in a side view of the vehicle.

According to this embodiment, the traveling wind flowing along the inside control section flows smoothly toward the front wheel, so that the atmospheric pressure of the central space portion can be further increased.

In another embodiment of the present invention, the inside control section is positioned on the inside, in the vehicle width direction, of the central part, in the vehicle width direction, of the front wheel.

In general, the traveling wind flowing along the inside control section flows obliquely rearwardly-and-outwardly because of a round shape of a corner portion of an end portion of a front bumper. Herein, according to this embodiment, since the inside control section is positioned on the inside, in the vehicle width direction, of the central part, in the vehicle width direction, of the front wheel, the traveling wind flowing along the inside control section comes to hit the central part, in the vehicle width direction, of the front wheel basically.

In another embodiment of the present invention, the deflector is attached to a lower face of a corner portion at an end part, in the vehicle width direction, of a front bumper of the automotive vehicle, and the corner portion is formed in a round shape such that an outside, in the vehicle width direction, of the corner portion is positioned at the rear side in the vehicle longitudinal direction.

According to this embodiment, the traveling wind flowing along the inside control section can be securely made to hit the central part, in the vehicle width direction, of the front wheel.

Other features, aspects, and advantages of the present invention will become apparent from the following description which refers to the accompanying drawings.

DETAILED DESCRIPTION OF THE INVENTION

Figure 1:
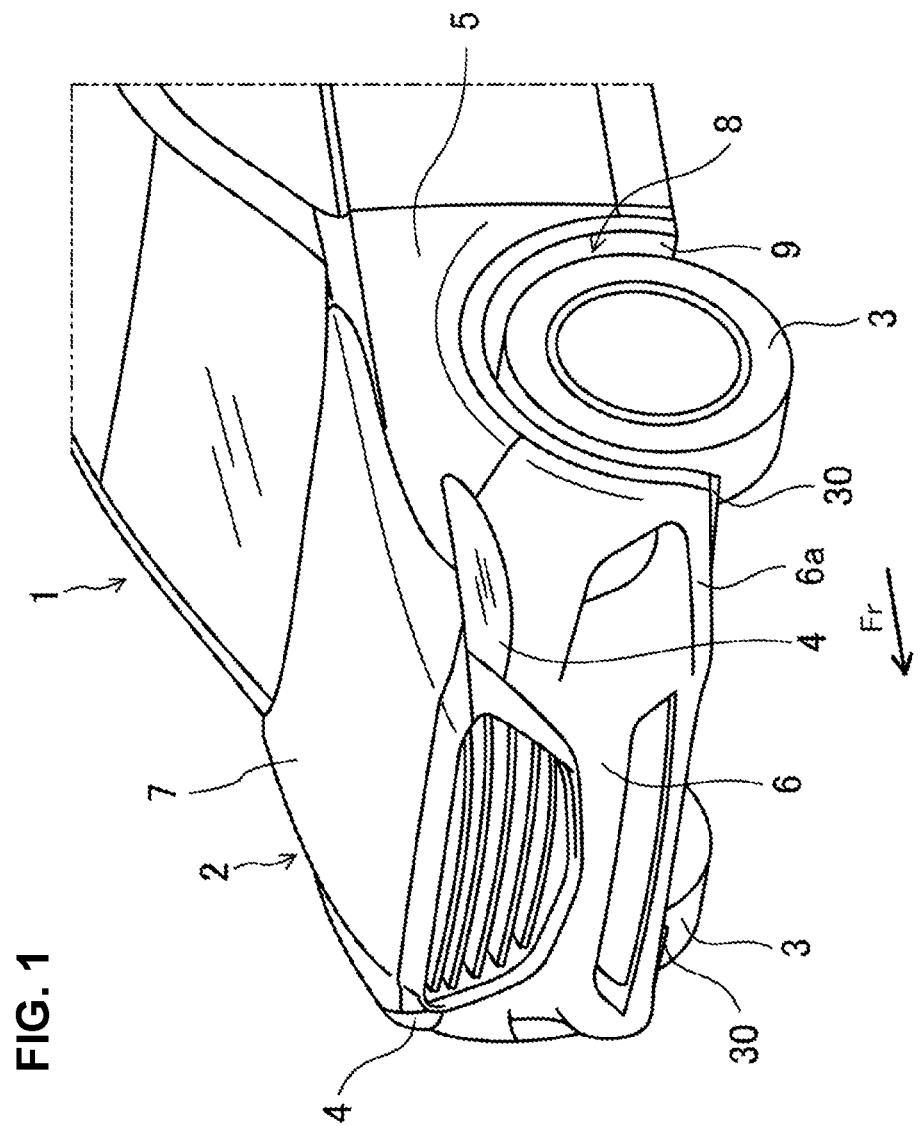
FIG. 1 is a perspective view showing an external appearance of a front part of an automotive vehicle which is provided with a deflector structure according to an embodiment of the present invention.

Hereafter, an embodiment of the present invention will be described specifically referring to the drawings.

FIG. 1 shows an external appearance of a front part 2 of an automotive vehicle 1 which is provided with a deflector structure according to the embodiment of the present invention. Hereafter, front, rear, left, right, upper and lower sides of the automotive vehicle 1 will be respectively referred to as front, rear, left, right, upper and lower sides, simply. In FIG. 1, an arrow Fr shows a front side of the automotive vehicle 1 (likewise, in FIGS. 2-5, 6A and 6B).

The front part 2 of the automotive vehicle 1, which is a portion located in front of a cabin portion where a driver rides, comprises a space where components for traveling of the automotive vehicle 1, such as an engine, a transmission, a cooling device, a suspension, a steering device, and a pair of right-and-left front wheels 3, are installed (including an engine room) and lights (lamps) for the front and the side of the automotive vehicle 1, such as a head light 4 or a fog lamp.

The front part 2 of the automotive vehicle 1 further comprises a pair of right-and-left front fender 5 (the left-side front fender 5 is illustrated in FIG. 1 only), which form right-and-left both-side side faces of the front part 2, a front bumper 6 which is provided at front ends of the pair of right-and-left front fender 5 (a front end of the automotive vehicle), and a bonnet (engine hood) 7 which covers an upper opening of the above-described installation space (engine room) enclosed by the pair of right-and-left front fenders 5 and the front bumper 6.

A corner portion 6a is formed at each of both end portions, in the vehicle width direction (lateral direction), of the front bumper 6 such that corner portion 6a goes around from the front end of the automotive vehicle 1 to the side of the automotive vehicle 1. This corner portion 6a is formed in a round shape, in a bottom view, such that an outside, in the vehicle width direction, of the corner portion 6a is positioned at the rear side in the vehicle longitudinal direction (see FIG. 2).

A pair of right-and-left front wheelhouses 8 which accommodate the front wheels 3 respectively are provided below the right-and-left front fenders 5. Each front wheelhouse 8 is covered with a mud guard 9 so that it is prevented that mud, small stones or water which are splashed by the front wheel 3 come into the above-described installation space. The mud guard 9 is made of hard synthetic resin, such as polypropylene, for example, and formed in an approximately arc shape in the side view of the automotive vehicle 1 so as to match a shape of an upper part of the front wheel 3.

Figure 2:
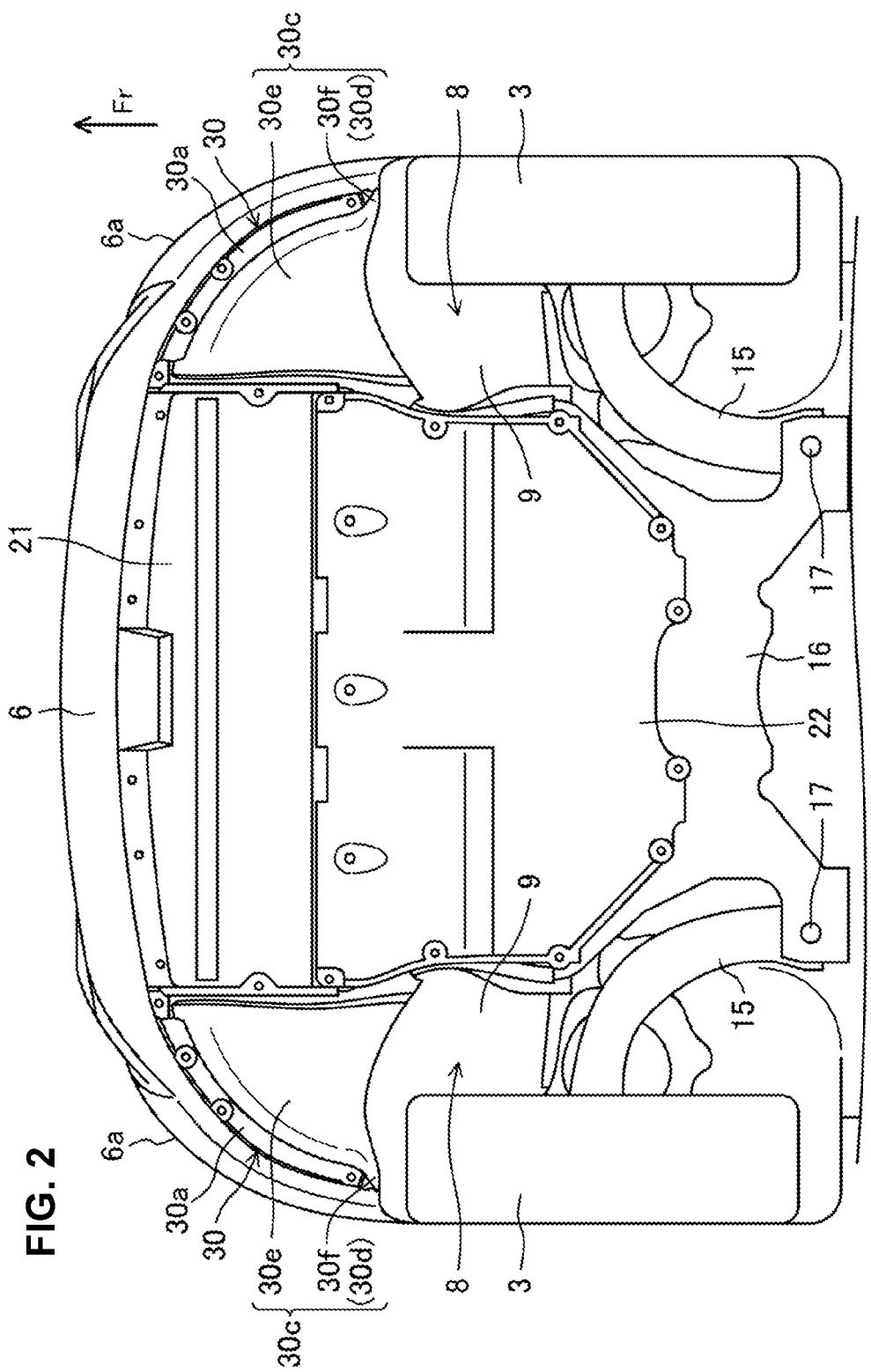
FIG. 2 is a bottom view of the front part of the automotive vehicle.

As shown in FIG. 2, the right-and-left front wheels 3 are supported at a suspension cross member 16 which extends in the vehicle width direction behind the engine via right-and-left suspension arms 15 (lower arms) which constitute a part of a front-wheel suspension. The front wheel 3 is supported by a one-end portion (an outside end portion in the vehicle width direction) of the suspension arm 15, and an other-end portion (an inside end portion in the vehicle width direction) of the suspension arm 15 is supported by an axis 17 which extends in the vertical direction via a rubber bush (not illustrated) at an end portion, in the vehicle width direction, of a rear-side part of the suspension cross member 16. Further, a central portion, in a longitudinal direction, of the suspension arm 15 is supported by another axis which extends in the vehicle longitudinal direction via a rubber bush at an end portion, in the vehicle width direction, of a front-side part of the suspension cross member 16, which is not illustrated here.

A front-side undercover 21 and a rear-side under cover 22 which is positioned in back of the front-side undercover 21 are provided at a lower face (bottom face) of the front part 2 of the automotive vehicle 1. The rear-side undercover 22 is positioned in front of the suspension cross member 16 and covers a lower side of the engine.

Figure 3:
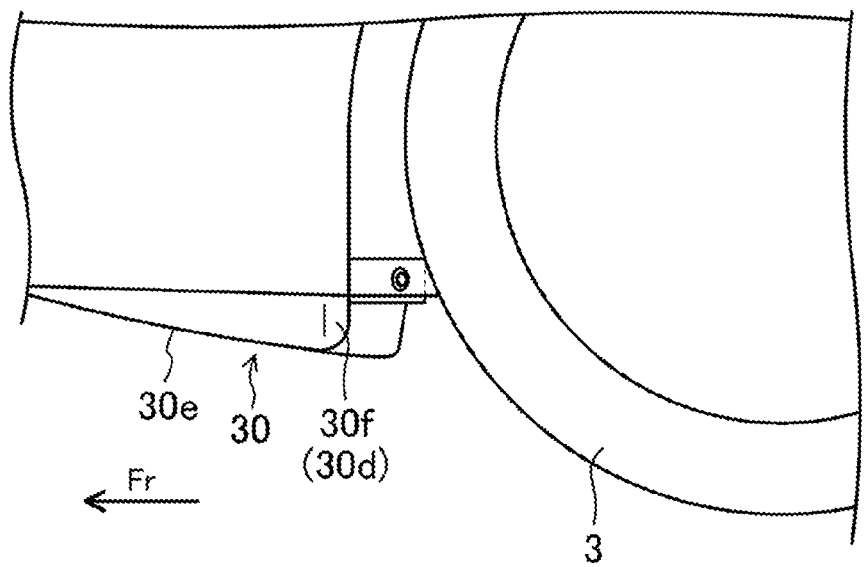
FIG. 3 is a left side view showing a part of the automotive vehicle around a left-side deflector.

As shown in FIGS. 2 and 3, a pair of right-and-left deflectors 30 are provided at a lower face of the front part 2 of the automotive vehicle 1. Each deflector 30 is provided in an area which is enclosed by a front end of the front wheel house 8 (a front end of the mud guard 9), the front bumper 6, and the front-side undercover 21. That is, the deflector 30 is provided at a lower face of the automotive vehicle 1 which is positioned in front of the front wheelhouse 8 so as to be forwardly spaced apart from the front wheel 3. The deflector 30 is fixedly attached to a lower face of the corner portion 6a of the front bumper 6 and a support member, not illustrated. A rear end of the deflector 30 extends in the vehicle width direction along the front end of the front wheelhouse 8. The deflector 30 controls a flow of a traveling wind generated in forward traveling of the automotive vehicle 1 so as to reduce the air resistance of the automotive vehicle 1. The deflector 30 is made of soft synthetic resin, such as flexible synthetic rubber.

The right-and-left deflectors 30 are positioned and shaped such that they are symmetrical relative to the center, in the vehicle width direction, of the automotive vehicle 1. Since respective structures of these deflectors 30 are substantially the same, the structure of the left-side deflector 30 (which is illustrated on the right in FIG. 2) will be specifically described. Herein, front, rear, left, right, upper and lower sides which will be used to describe the left-side deflector 30 respectively mean front, rear, left, right, upper and lower sides of the automotive vehicle 1 in a state where the left-side deflector 30 is attached to the automotive vehicle 1.

Figure 4:
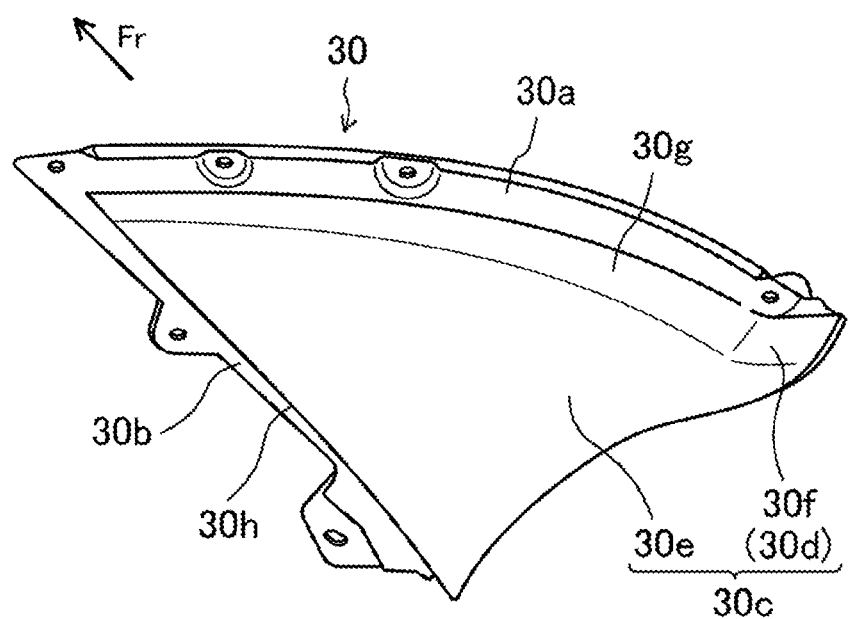
FIG. 4 is a perspective view of the left-side deflector, when viewed from an obliquely-lower side.
Figure 5:
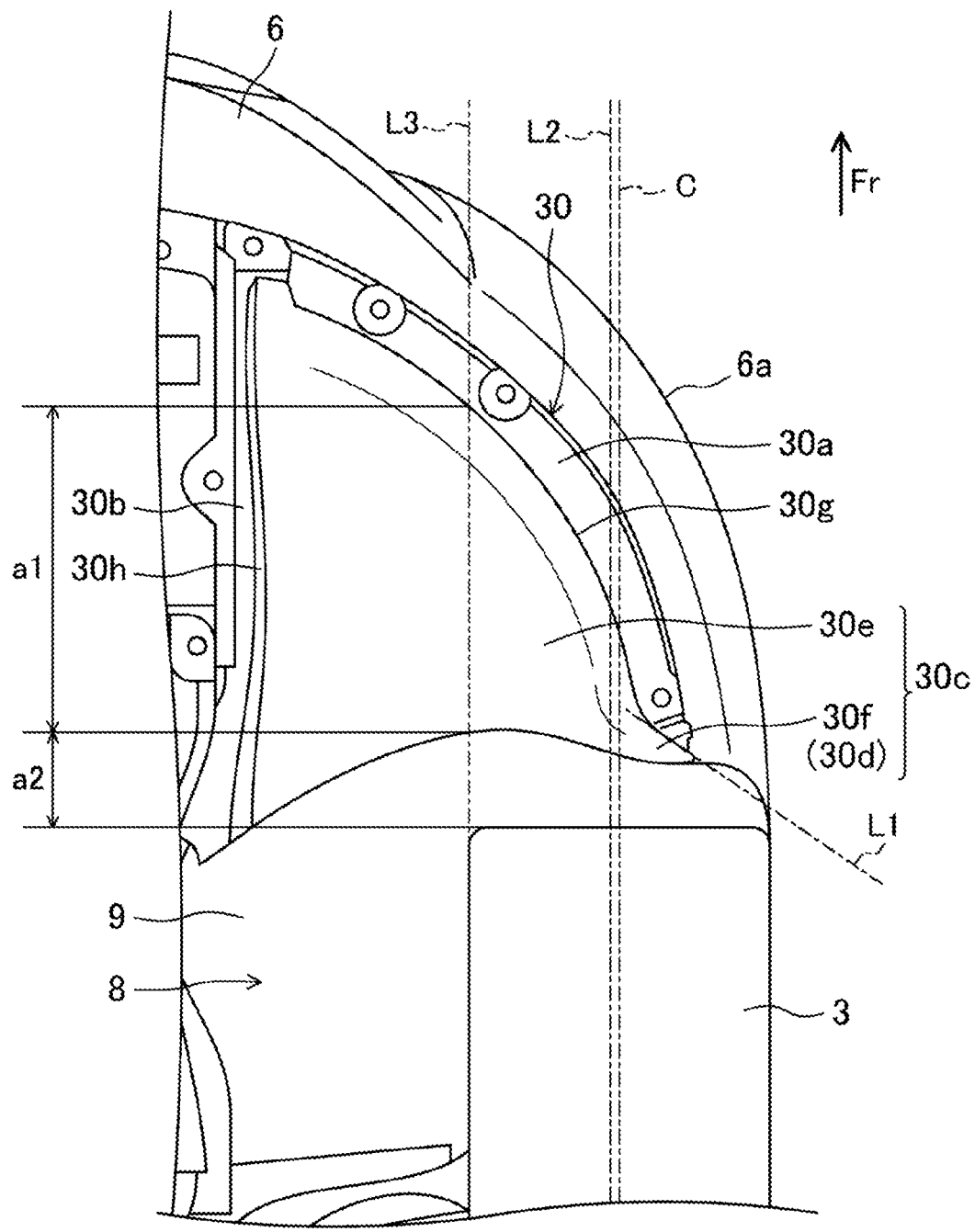
FIG. 5 is an enlarged bottom view showing the part of the automotive vehicle around the left-side deflector.

In the present embodiment, as shown in FIGS. 2, 4 and 5, the left-side deflector 30 (hereafter, referred to as the deflector 3 simply) is formed in an approximately fan shape in a bottom view of the automotive vehicle 1, and a portion of the deflector 30 which corresponds to an arc of this fan shape (a curved portion which extends from its front end to its outside end) is configured to have a similar shape to the corner portion 6a of the front bumper 6 (round shape). An attachment part 30a which is fixedly attached to the lower face of the corner portion 6a of the front bumper 6 at plural fixing points by bolts is provided at the above-described curved portion of the deflector 30 such that this attachment part 30a protrudes upwardly. Further, another attachment part 30b which is fixedly attached to the above-described support member at plural fixing points by bolts is provided at an inside end, in the vehicle width direction, of the deflector 30 such that this attachment part 30b protrudes upwardly. Step faces 30g, 30h are respectively formed between the attachment parts 30a, 30b and an inside control section 30e, which will be described later, such that the inside control section 30e is located at a lower level than the attachment parts 30a, 30b.

The deflector 30 comprises a traveling-wind control part 30c to control a flow of the traveling wind generated in the forward traveling of the automotive vehicle 1. This traveling-wind control part 30c comprises an outside control section 30d which is provided at an outside end portion, in the vehicle width direction, of the deflector 30 (a rear end portion of the step face 30g in the present embodiment) and the inside control section 30e which is positioned on the inside, in the vehicle width direction, of the outside control section 30d.

The outside control section 30d and the inside control section 30e are shaped such that an atmospheric pressure of an outside space portion which is positioned just in front of an outside part, in the vehicle width direction, of the front wheel 3 (the left-side front wheel 3) is lower than that of a central space portion which is positioned just in front of a central part, in the vehicle width direction, of the front wheel 3 at a level position from a lower end of the deflector 30 (which corresponds to a rear end of the deflector 30 in the present embodiment because the rear end of the deflector 30 of the present embodiment is located in the lowest level) to a vicinity below the lower end of the deflector 30 (for example, at a level position from the lower end of the deflector 30 to a level position which is 30 mm below the lower end of the deflector 30). In the present embodiment, the atmospheric pressure of the space portion positioned just in front of the front wheel 3 at the level position from the lower end of the deflector 30 to the vicinity below the lower end of the deflector 30 is configured such that the magnitude of that becomes gradually small as the position of that goes to the outside in the vehicle width direction as shown in the atmospheric-pressure distribution of FIG. 6A. Herein, a distance between the lower end of the deflector and a horizontal ground surface is about 110 mm in the present embodiment.

Specifically, the outside control section 30d is formed by a fin portion 30f which protrudes to the outside in the vehicle width direction at an end portion (a rear end of the step face 30g) of the deflector 30 which is positioned at the outside in the vehicle width direction and the rear side in a vehicle longitudinal direction. The fin portion 30f has a front-side end face where the traveling wind hits. This front-side end face of the fin portion 30f is configured to extend obliquely such that an outside part, in the vehicle width direction, of the front-side end face is positioned at the rear side in the vehicle longitudinal direction. The front-side end face of the fin portion 30f is continuous to the step face 30g. A lower face of the fin portion 30f forms an identical face with the inside control section 30e. The outside end (protrusion end) of the fin portion 30f is positioned on the inside, in the vehicle width direction, of an outside end face, in the vehicle width direction, of the front wheel 3. Further, the fin portion 30f is configured such that an extension line L1 (see FIG. 5) of the front-side end face thereof does not intersect the front wheel 3 in the bottom view of the automotive vehicle 1. Thereby, the traveling wind hitting the front-side end face of the fin portion 30f is bent in the vehicle width direction, so that this traveling wind does not hit the front wheel 3. Herein, it is preferable that the extension line L1 be positioned as closely to the front wheel 3 as possible, without intersecting the front wheel 3, in the bottom view of the automotive vehicle 1.

Meanwhile, the inside control section 30e is formed by the lower face of the deflector 30, so that the raveling wind flows down toward the front wheel 3 along the inside control section 30e. The inside control section 30e of the present embodiment is a slant face which is configured such that a rear side, in the vehicle longitudinal direction, of the slant face is positioned at a lower level and an extension line of this slant face intersects the front wheel 3 in a side view of the automotive vehicle 1 (see FIG. 3). Thereby, it is likely that the traveling wind flowing down along the inside control section 30e flows toward the front wheel 3 smoothly.

The inside control section 30e of the present embodiment is positioned on the inside, in the vehicle width direction, of the center, in the vehicle width direction, of the front wheel 3. That is, as shown in FIG. 5, the inside control section 30e is positioned on the inside, in the vehicle width direction, of a center line C which passes through the center, in the vehicle width direction, of the front wheel 3 in the bottom view of the automotive vehicle 1. In the present embodiment, a line L2 which passes through a border between the outside control section 30d and the inside control section 30e (which passes a base end of the fin portion 30f) is positioned such that a distance between this line L2 and a line L3 which passes through the inside end face, in the vehicle width direction, of the front wheel 3 becomes ⅖ (40%) of the width of the front wheel 3 in the bottom view of the automotive vehicle 1, for example. Further, in the present embodiment, a length a1, in the vehicle longitudinal direction, of the inside control section 30e on the line L3 is about 170 mm, and a distance a2 between the front wheel 3 and the inside control section 30e (the rear end of the deflector 30) on the line L3 is about 130 mm in the bottom view of the automotive vehicle 1, for example. Herein, the above-described length and distance should not be limited to these figures.

The traveling wind flowing along the inside control section 30e flows obliquely rearwardly-and-outwardly because of the round shape of the corner portion 6a of an end portion, in the vehicle width direction, of the front bumper 6. Accordingly, since the inside control section 30e is positioned on the inside, in the vehicle width direction, of the center, in the vehicle width direction, of the front wheel 3, the traveling wind flowing along the inside control section 30e hits the central part, in the vehicle width direction, of the front wheel 3 basically. Meanwhile, the traveling wind flowing through on the outside, in the vehicle width direction, of the above-described traveling wind flowing along the inside control section 30e is bent to the outside in the vehicle width direction by the front-side end face of the fin portion 30f, so that this traveling wind does not hit the front wheel 3.

Figure 6A:
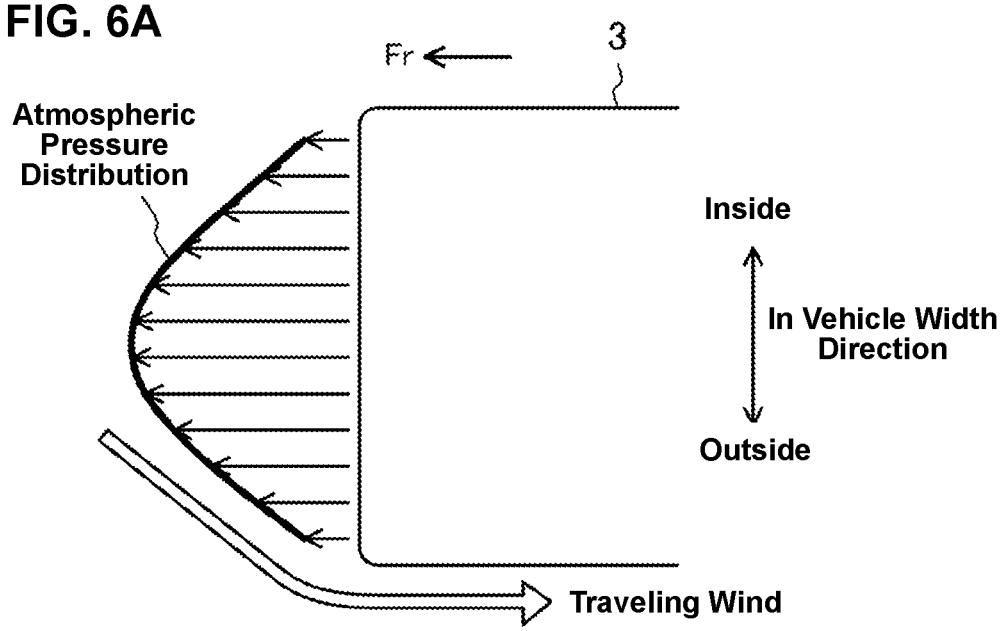
FIG. 6A is a diagram showing a schematic distribution, in a vehicle width direction, of an atmospheric pressure of a space portion positioned just in front of a front wheel and a flow of a traveling wind generated in a forward traveling of the automotive vehicle at a level position from a lower end of the deflector to a vicinity below the lower end of the deflector according to the present embodiment.
Figure 6B:
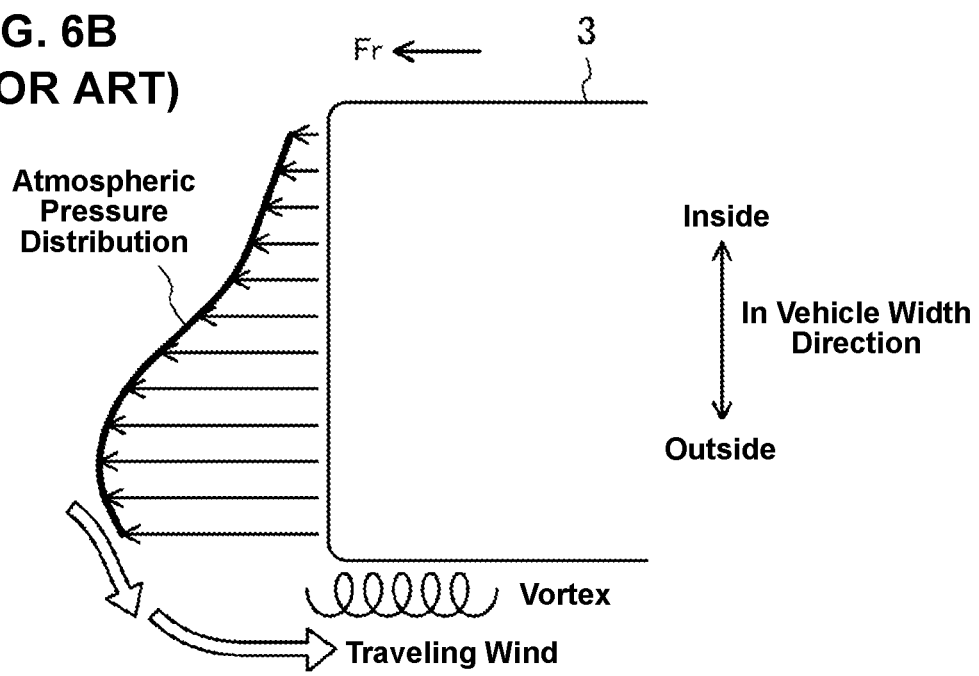
FIG. 6B is a diagram showing, according to a conventional example where a conventional deflector is used in place of the deflector of the present embodiment, a schematic distribution, in the vehicle width direction, of the atmospheric pressure of the space portion positioned just in front of the front wheel and a flow of a traveling wind generated in the forward traveling of the automotive vehicle at a level position from a lower end of the conventional deflector to a vicinity below the lower end of the conventional deflector.

FIG. 6A shows a schematic distribution, in the vehicle width direction (in a width direction of the front wheel 3), of the atmospheric pressure of the space portion positioned just in front of the front wheel 3 and a flow of the traveling wind generated in the forward traveling of the automotive vehicle 1 at the level position from the lower end of the deflector 30 to the vicinity below the lower end of the deflector 30 according to the present embodiment. FIG. 6B shows, according to a conventional example where the conventional deflector having the vertically-extending wall part (see the above-described patent document) is used in place of the deflector 30, a schematic distribution, in the vehicle width direction, of the atmospheric pressure of the space portion positioned just in front of the front wheel 3 and a flow of the traveling wind generated in the forward traveling of the automotive vehicle 1 at a level position from a lower end of the conventional deflector to a vicinity below the lower end of the conventional deflector. In FIGS. 6A and 6B, a length of each arrow in the atmospheric-pressure distributions shows the magnitude of the atmospheric pressure such that the longer the arrow length is, the greater (higher) the magnitude of the atmospheric pressure is, and white arrow show flows of the traveling wind.

In the above-described conventional example, since the traveling wind passing through on the outside, in the vehicle width direction, of the wall part of the deflector hits the outside part of the front wheel 3, the atmospheric pressure of the outside space portion which is positioned just in front of this outside part of the front wheel 3 becomes higher than that of the central space portion which is positioned just in front of the central part, in the vehicle width direction, of the front wheel 3 at the level position from the lower end of the wall part of the deflector to the vicinity below the lower end of the deflector as shown in FIG. 6B. According to this atmospheric-pressure distribution, the traveling wind flows down obliquely rearwardly-and-outwardly so as to turn away from and avoid the outside space portion. Thus, this traveling wind flows down away from the outside end face of the front wheel 3, without flowing down along this outside end face. Accordingly, the conventional deflector makes a situation where it is likely that a separated airflow (vortex) is improperly generated around the outside end face of the front wheel 3.

According to the present invention, however, the atmospheric pressure of the outside space portion is lower than that of the central space portion at the level position from the lower end of the deflector 30 to the vicinity below the lower end of the deflector 30 as shown in FIG. 6A. The above-described distribution of the atmospheric pressure causes the traveling wind to flow obliquely rearwardly-and-outwardly from the central space portion toward the outside space portion at the space portion positioned in front of the front wheel 3 because the traveling wind tends to flow down to the outside space portion having the lower atmospheric pressure, avoiding the central space portion having the higher atmospheric pressure. Then, the traveling wind flowing toward the outside space portion from the central space portion comes to flow along the end face of the outside end face of the front wheel 3. Accordingly, it is unlikely that the separated airflow (vortex) is generated around the outside end face of the front wheel 3, so that the air resistance of the automotive vehicle 1 can be reduced. Herein, while the atmospheric pressure of the inside space portion which is positioned just in front of the inside part, in the vehicle width direction, of the front wheel 3 is also lower than that of the central space portion in the present embodiment, this atmospheric pressure of the inside space portion may be higher than that of the central space portion.

Figure 7:
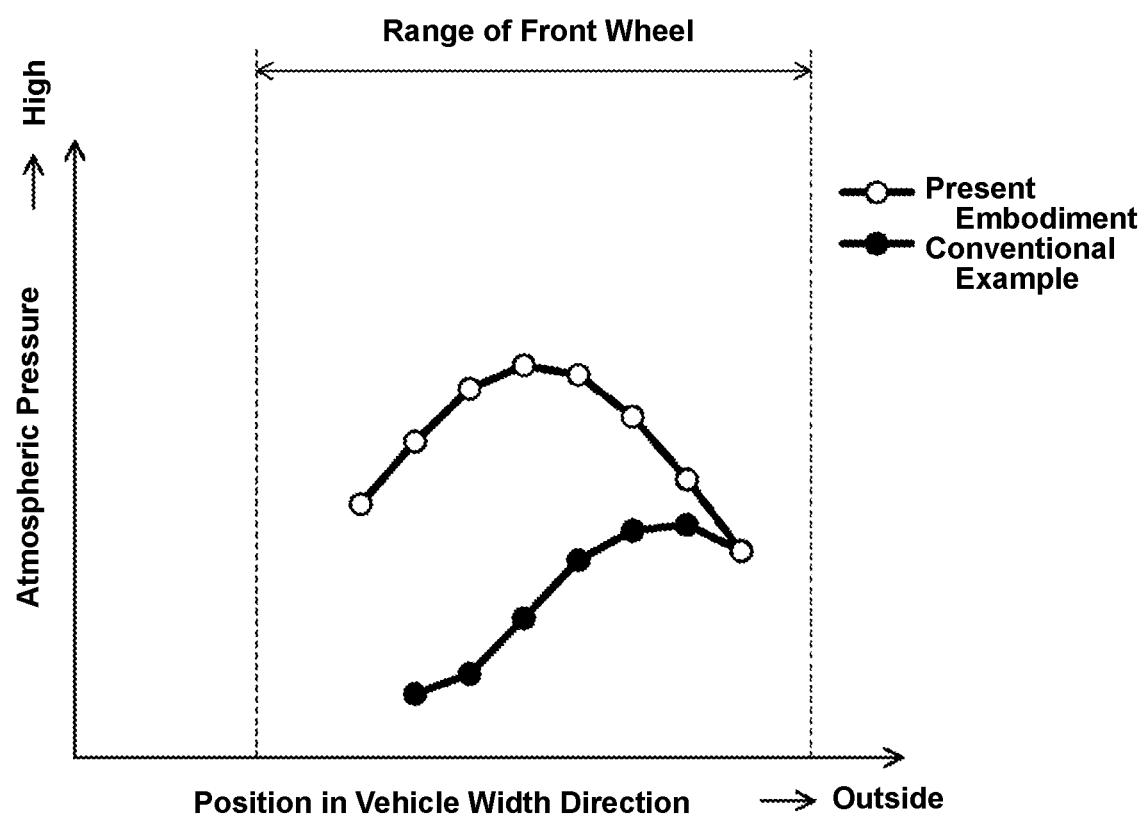
FIG. 7 is a graph showing respective results of the measured distribution, in the vehicle width direction, of the atmospheric pressure of the space portion positioned just in front of the front wheel according to the present embodiment and the measured distribution, in the vehicle width direction, of the atmospheric pressure of the space portion positioned just in front of the front wheel according to the conventional example at the respective level positions of the vicinity below the respective lower ends of the respective deflectors.

FIG. 7 shows respective results of the measured distribution, in the vehicle width direction, of the atmospheric pressure of the space portion positioned just in front of the front wheel 3 according to the present embodiment and the measured distribution, in the vehicle width direction, of the atmospheric pressure of the space portion positioned just in front of the front wheel 3 according to the conventional example at the respective level positions of the vicinity below the respective lower ends of the respective deflectors (herein, at the level position which is about 15 mm below the lower ends of the respective deflectors). In each case, the speed of the automotive vehicle is 100 km/h when the above-described distribution is measured. According to the above-described measurement results, it is found that the schematic atmospheric-pressure distributions shown in FIGS. 6A and 6B are substantially the same. Herein, the reason why the atmospheric pressure of the present embodiment is fundamentally higher than that of the conventional example is that the traveling wind is made to hit the central part, in the vehicle width direction, of the front wheel 3 primarily.

Thus, since the outside control section 30d and the inside control section 30e of the present embodiment are shaped such that the atmospheric pressure of the outside space portion is lower than that of the central space portion at the level position from the lower end of the deflector 30 to the vicinity below the lower end of the deflector 30, the traveling wind generated in the forward raveling of the automotive vehicle 1 comes to flow along the end face of the outside end face of the front wheel 3, so that the air resistance of the automotive vehicle can be properly reduced.

The present invention should not be limited to the above-described embodiment and any other modifications or improvements may be applied within the scope of a spirit of the present invention.

The present invention is useful for any deflector structure of an automotive vehicle which comprises a deflector provided at a lower face of the automotive vehicle which is positioned in front of a front wheelhouse so as to be forwardly spaced apart from a front wheel.

What is claimed is:

1. A deflector structure of an automotive vehicle, comprising:
   a deflector provided at a lower face of the automotive vehicle which is positioned in front of a front wheelhouse so as to be forwardly spaced apart from a front wheel,
   wherein said deflector comprises a traveling-wind control part to control a flow of a traveling wind generated in forward traveling of the automotive vehicle,
   said traveling-wind control part comprises an outside control section provided at an outside end portion, in a vehicle width direction, of said deflector and an inside control section positioned on an inside, in the vehicle width direction, of said outside control section,
   said outside control section and said inside control section are shaped such that an atmospheric pressure of an outside space portion which is positioned just in front of an outside part, in the vehicle width direction, of the front wheel is lower than that of a central space portion which is positioned just in front of a central part, in the vehicle width direction, of the front wheel at a level position from a lower end of the deflector to a vicinity below the lower end of the deflector, and
   said inside control section is formed by a lower face of said deflector such that the traveling wind flows down toward the front wheel along the inside control section, and said outside control section is formed by a fin portion which protrudes to an outside in the vehicle width direction at an end portion of the deflector which is positioned at the outside in the vehicle width direction and a rear side in a vehicle longitudinal direction, said fin portion being configured to have a front-side end face which extends obliquely such that an outside part, in the vehicle width direction, of the front-side end face is positioned at the rear side in the vehicle longitudinal direction and an extension line of the front-side end face does not intersect the front wheel in a bottom view of the vehicle.

2. The deflector structure of the automotive vehicle of claim 1, wherein said inside control section is a slant face which is configured such that a rear side, in the vehicle longitudinal direction, of the slant face is positioned at a lower level and an extension line of the slant face intersects the front wheel in a side view of the vehicle.

3. The deflector structure of the automotive vehicle of claim 2, wherein said inside control section is positioned on the inside, in the vehicle width direction, of the central part, in the vehicle width direction, of the front wheel.

4. The deflector structure of the automotive vehicle of claim 3, wherein said deflector is attached to a lower face of a corner portion at an end part, in the vehicle width direction, of a front bumper of the automotive vehicle, and said corner portion is formed in a round shape such that an outside, in the vehicle width direction, of the corner portion is positioned at the rear side in the vehicle longitudinal direction.

5. The deflector structure of the automotive vehicle of claim 1, wherein said inside control section is positioned on the inside, in the vehicle width direction, of the central part, in the vehicle width direction, of the front wheel.

6. The deflector structure of the automotive vehicle of claim 5, wherein said deflector is attached to a lower face of a corner portion at an end part, in the vehicle width direction, of a front bumper of the automotive vehicle, and said corner portion is formed in a round shape such that an outside, in the vehicle width direction, of the corner portion is positioned at the rear side in the vehicle longitudinal direction.

* * * * *